Reissued May 25, 1943 Re. 22,320

UNITED STATES PATENT OFFICE 22,320

MATERIAL FOR SHOE STIFFENERS

Hugo Boeddinghaus, Newburgh, N. Y., assignor to American Felt Company, New York, N. Y., a corporation of Massachusetts No Drawing. Original No. 2,298,274, dated October 13, 1942, Serial No. 351,237, August 3, 1940. Application for reissue February 26, 1943, Serial No. 477,290

4 Claims. (Cl. 36—68)

This application is a continuation-in-part of my co-pending application Serial No. 328,768, filed April 9, 1940, for Felt-like fabrics and method of producing the same, which in turn is a continuation-in-part of my application Serial No. 211,926, filed June 4, 1938.

The invention of this present application relates to material for shoe stiffeners, and has for its principal objects to provide an improved shoe stiffener capable of being made in a simpler manner than prior shoe stiffeners, easy to ship and handle, and easy to soften and bend into the appropriate curved shape for application to the shoe.

Other objects of invention and features of advantage and utility will be apparent from this specification wherein the invention is explained by way of example.

In a preferred example of the invention, material is prepared in a manner now to be described. A thorough mixture of from 30%, or preferably more than 30%, up to approximately 50% synthetic thermoplastic fibers and the remainder of cotton fibers (preferably about 40% synthetic fibers and 60% cotton fibers) is prepared by subjecting both kinds of fibers together to a picking operation, to a blowing operation (usually repeated a number of times), and to a carding operation (preferably at least twice). The effect of these operations is to produce a thin carded web in which the thermoplastic fibers and the non-thermoplastic fibers are very uniformly distributed throughout the web. A plurality of these webs are then superposed to provide a batt of material weighing, for example, 35 ounces per square yard, the exact weight depending upon the requirements of the trade.

The batt is then subjected to a hot-pressing operation to bond the thermoplastic fibers. For this purpose the apparatus disclosed in my copending application for Bonding sheet material, filed July 30, 1940, Serial No. 348,371, may be employed. In this hot-pressing operation, the batt of material is subjected to a pressure of approximately 700 pounds per square inch between press plates that are heated to approximately 300° F. The material is protected from adhesion to the press plates by suitable non-thermoplastic textile aprons during the pressing.

The resulting product is a thin sheet of approximately .055 to .065 inch thickness of stiffness and bendability comparable to shoe stiffeners customarily used. This sheet material can be cut to the usual shape of a shoe stiffener, for example, to the shape of a box toe stiffener, and its edges skived in the customary manner.

The shoe stiffener produced by this procedure thus comprises a sheet in which the requisite stiffness and strength is secured by means of the fibrous material of which the sheet is composed, so that no filling or weighting material, such as wax, rosin or the like, need be employed.

The stiffeners, produced as described, can be shipped in a dry state to the shoe factory and can be stored for as long as desired without danger of deterioration. To prepare the stiffeners for use they can be softened either by application of heat or by application of a suitable volatile solvent, and bent to the desired shape on the last. In using a solvent for the purpose of softening the stiffeners, there should be applied only sufficient solvent action to soften the material and not to disintegrate the thermoplastic fibers of the material.

As the thermoplastic fiber, there may be employed a considerable range of fibrous material, the requirements being in general that these thermoplastic fibers shall be sufficiently long, strong and pliable to withstand the carding operation and be capable of softening sufficiently to bond with one another at temperatures sufficiently low not to harm the cotton fibers. A preferred thermoplastic fiber for this purpose has been found to be a plasticized acetate rayon, available under the trade name of "Tenite." Other suitable fibers are:

1. Vinylite, also known under the trade name of "Vinyon," a conjoint polymer of a vinyl halide with a vinyl ester of a lower molecular aliphatic acid as vinyl acetate, referred to at times as vinyl resin fibers.

2. Methyl methacrylate resins such as are available under the trade name of "Lucite."

3. "Nylon," a polyamide produced by the reaction between a primary or a secondary diamine and either a dicarboxylic acid or an amide-forming derivative of a dibasic carbolic acid.

I claim:

1. A shoe stiffener in the form of a sheet consisting of a carded mixture of from more than 30 per cent to approximately 50 per cent of thermoplastic fibers and the remainder substantially all cotton fibers, said mixture being bonded and compacted to a stiff condition by hot pressure and being capable of being softened by the action of heat or solvent.

2. A shoe stiffener in the form of a sheet consisting of a carded mixture of approximately 40 per cent of thermoplastic fibers and approximately 60 per cent of cotton fibers, said mixture being bonded and compacted to a stiff condition by hot pressure and being capable of being softened by the action of heat or solvent.

3. A shoe stiffener in the form of a sheet consisting of a carded mixture of from more than 30 per cent to approximately 50 per cent of thermoplastic fibers and the remainder substantially all cotton fibers, said mixture being bonded and compacted to a stiff condition by hot pressure, being capable of being softened by the action of heat or solvent and weighing approximately 35 ounces per square yard.

4. A shoe stiffener in the form of a sheet consisting of a carded mixture of from more than 30 per cent to approximately 50 per cent of thermoplastic fibers and the remainder substantially all cotton fibers, said mixture being bonded and compacted to a stiff condition by hot pressure, and being capable of being softened by the action of heat or solvent and said sheet being approximately .055 inch to approximately .065 inch in thickness.

HUGO BOEDDINGHAUS.